United States Patent [19]
Clawson

[11] 3,824,965
[45] July 23, 1974

[54] FUEL SYSTEM

[75] Inventor: Lawrence G. Clawson, Dover, Mass.

[73] Assignee: Thermo Electron Corporation, Waltham, Mass.

[22] Filed: May 30, 1972

[21] Appl. No.: 257,710

Related U.S. Application Data

[63] Continuation-in-part of Ser. No. 219,385, Jan. 20, 1972, abandoned, which is a continuation-in-part of Ser. No. 32,289, April 27, 1970, abandoned, which is a continuation-in-part of Ser. No. 776,285, May 23, 1968, Pat. No. 3,508,530.

[52] U.S. Cl. ......... 123/32 R, 123/32 C, 123/32 ST, 123/32 SP, 123/139 AW
[51] Int. Cl. ............................................ F02b 17/00
[58] Field of Search......... 123/32 SP, 32 SA, 32 ST, 123/32 R, 143 A, 191 SP

[56] References Cited
UNITED STATES PATENTS

| | | | |
|---|---|---|---|
| 2,676,603 | 4/1954 | Kollsman | 123/119 X |
| 2,884,913 | 5/1959 | Heintz | 123/191 SP |
| 2,914,043 | 11/1959 | Nallinger | 123/32 ST |
| 3,113,561 | 12/1963 | Heintz | 123/191 SP |
| 3,154,058 | 10/1964 | Warren | 123/32 SA |
| 3,174,470 | 3/1965 | Von Seggern et al. | 123/32 ST |
| 3,406,667 | 10/1968 | Evans et al. | 123/143 A |
| 3,443,552 | 5/1969 | Von Seggern et al. | 123/32 ST |
| 3,450,353 | 6/1969 | Eckert | 123/32 EA |
| 3,483,851 | 12/1969 | Reichardt | 123/119 R |

Primary Examiner—Laurence M. Goodridge
Attorney, Agent, or Firm—James L. Neal

[57] ABSTRACT

A low pressure direct injection fuel system for preignition engines in which the main fraction of the compressed charge of the engine is ignited by exposure to a hot gas exiting from a smaller volume spark ignition prechamber forces fuel into each chamber and/or prechamber of the engine during all or a segment of the low pressure scavenging periods of the engine cycle via passages containing valves to prevent backflow of fuel and gases during the high pressure period of the engine cycle. The engine runs unthrottled solely on the prechamber fuel charge and the amount of fuel fed to the prechamber is decreased with increased engine load so that a uniform combustible charge is present in the prechamber during all engine load and speed regimes.

10 Claims, 7 Drawing Figures

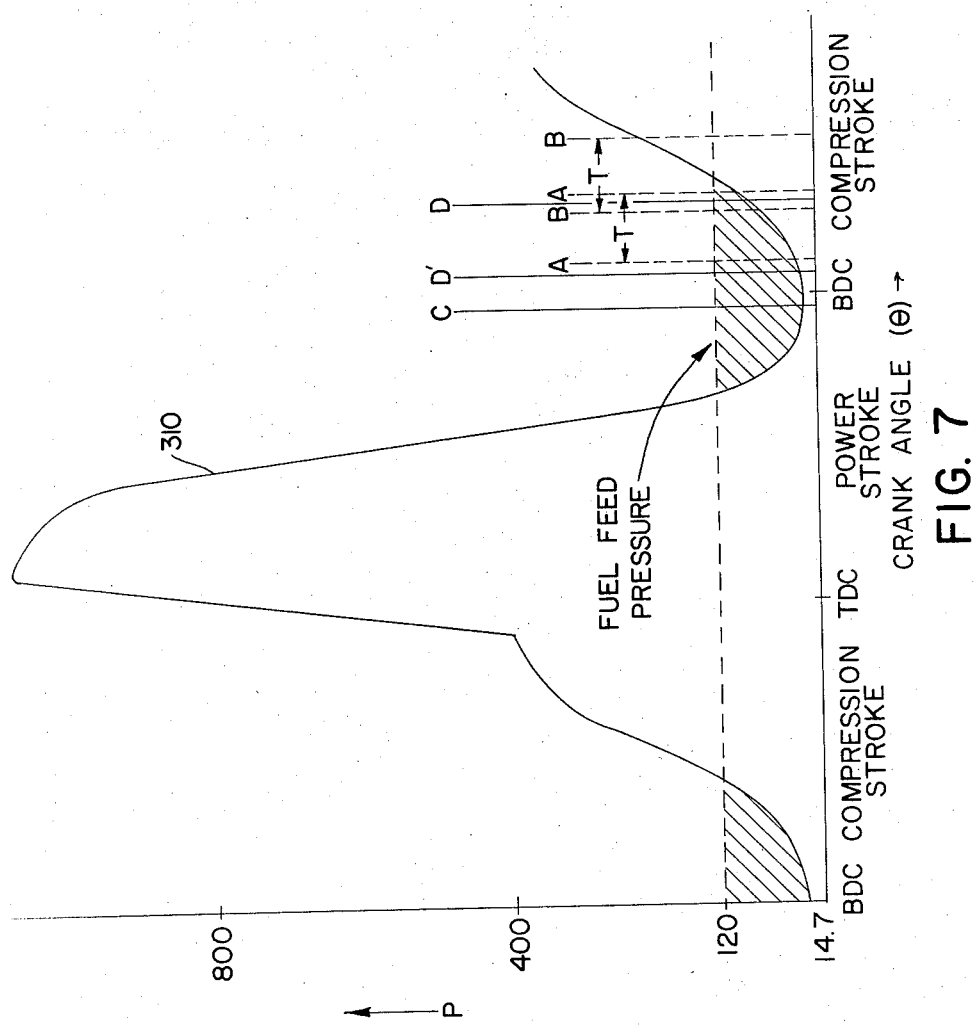

FUEL SYSTEM

RELATED APPLICATIONS

This application is a continuation-in-part of my copending application Ser. No. 219,385, filed Jan. 20, 1972, which is a continuation-in-part of my application Ser. No. 32,289, filed Apr. 27, 1970, both now abandoned, which is a continuation-in-part containing divisional subject matter of my application Ser. No. 776,285, filed May 23, 1968 now U.S. Pat. No. 3,508,530.

BACKGROUND OF THE INVENTION

This invention relates to an improved fuel induction system for dual chamber or preignition engines. The referenced preignition engine types are already well-known. For example, U.S. Pat. No. 2,750,576 and the *Society of Automotive Engineers Journal*, November, 1963, pages 60–64, describe a preignition engine of the reciprocating variety; British Patent No. 995,101 describes a rotary piston engine which also operates on the preignition principle. U.S. Pat. No. 3,508,530 describes particularly effective combustion chamber geometries for preignition type engines.

The conventional preignition engines have not been widely accepted for several reasons. One very important limitation has been the difficulty in metering small quantities of fuel to the prechambers in particular, and the impracticality and high cost of the direct injection fuel systems which are available.

More particularly, because they often run unthrottled, preignition engines demand that a small precise amount of fuel be introduced into the prechamber during each engine cycle. Furthermore, the total amount of combustible fuel in the prechamber must remain substantially constant over a wide range of engine speeds. On the other hand, to decrease exhaust hydrocarbon emissions and improve engine efficiency, fuel in variable quantities should be injected directly into the main chamber for increased output as opposed to carburetion of the induction air, or so-called port injection. This is particularly true in the case of two-cycle engines. Conventional injection systems are unable to consistently deliver the proper fuel charges to both chambers and satisfy both of these requirements during all or part of the engine's load and speed regimes. This degrades engine performance. Even those engines with marginal performance have to inject the fuel very quickly and, therefore, very close to top dead center. Therefore, very high injection pressures are required, e.g. 800–2000 psi. Diesel engines, for example, run at these high pressures. So do pulsed systems such as shown in U.S. Pat. No. 2,914,043. This, in turn, demands the use of expensive, high-pressure pumps and fuel lines.

Also, all of the known prior art fuel injection systems require rather complex distributing and timing mechanisms to control injection of fuel in the desired quantities, at the proper amount, and in the required sequence to secure efficient operation of internal combustion engines. For example, U.S. Pat. No. 3,187,733 describes a fuel injection system in which a pump delivers fuel from a tank through a pressure regulating valve to a distributing mechanism and thence to a plurality of differential injection valves. The distributor mechanism is driven by the engine and causes each injection valve to open at the required time during the operating cycle of its associated cylinder.

There are also proposed engines which mix air and fuel and inject the mixture into the prechamber. This technique requires an extra valve into the prechamber which must open for a very brief interval during each cycle and then provide a positive fluidtight seal for the rest of the time. An example of such an engine is shown in U.S. Pat. No. 2,884,913. In practice, the valves do not provide the requisite seal. After only a short time in use, leakage occurs. In other words, it is very difficult to provide a seal for both a liquid (gasoline) and a gas (air) which will last in the engine environment. Simple check valves do not work, for example.

Other prior fuel injection systems require a positive displacement control of the introduction of fuel into the cylinder. For example, in some systems, timing of injection is governed solely by movement of a fuel pump piston. In still other engines, vacuum tanks have been employed to draw measured quantities of fuel for injection through elaborate fuel distribution valving systems. Aside from considerations of cost and complexity, these prior types of fuel injection systems do not elicit top performance from preignition engines.

SUMMARY OF THE INVENTION

Accordingly, this invention aims to provide an improved fuel injection system for an internal combustion engine of the preignition type.

A corollary object is to reduce the cost of fuel injection control systems for these engines.

A further object is to provide a fuel injection system which delivers controlled amounts of fuel to preignition engines so that there is minimum variation in the prechamber fuel charge over a wide variety of engine speeds and loads.

Another object is to increase the reliability of fuel injection systems of this type by reducing the number of moving parts required for proper fuel distribution and injection timing.

Yet another object of the invention is to provide a fuel injection system which can handle a variety of different fuels.

A further object is to provide a method of injecting fuel into an internal combustion engine providing one or more of the above-stated advantages.

Yet another object is to provide a fuel system of this type which operates at constant relatively low fuel pressures, e.g. 30–120 psi.

Other objects will in parts be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

Briefly, my system employs a fuel pump which delivers undiluted fuel (i.e. fuel unmixed with air) under substantially uniform, relatively low pressure, e.g. under 150 psi, to a fuel distributing manifold which feeds the fuel to the prechamber in each engine cylinder on demand. A separate flow connecting line from the manifold to each prechamber includes a valve which remains closed except when the fuel pressure exceeds the prechamber pressure. Timing of fuel injection is controlled by operation of the conventional cylinder valves and/or piston during each operating cycle, by the release pressure to which the valve is set, and by the fuel pressure maintained in the fuel manifold and in one preferred embodiment, by electrically controlling the valve. The amount of fuel fed to each prechamber, as well as the rate of fuel flow, are controlled so that the engine runs unthrottled solely on the fuel charge in the prechamber. Engine speed is controlled by varying the amount of fuel fed into the main combustion chamber of each cylinder and as the engine load increases, while the amount of fuel fed to to the prechamber is decreased so as to maintain a uniform combustible mixture in the prechamber during all engine speed and load regimes. Thus, the system eliminates the need for the prior art fuel distributing mechanisms and achieves the controlled injection of fuel into the prechambers at the proper times, in the required sequence, and desired amounts. Furthermore, it does not require extra valves or high fuel delivery pressures such as used in direct injection Diesel engines with their attendant expensive, high-pressure fuel lines, pumps, etc.

BRIEF DESCRIPTION OF THE DRAWINGS

For a fuller understanding of the nature and objects of the invention, reference should be had to the following detailed description taken in connection with the accompanying drawings, in which:

FIG. 7 is a graph similar to FIG. 4 illustrating the characteristics of the FIG. 5 system with a two-cycle engine.

Referring now to FIG. 1 specifically, a preignition Otto cycle engine 50 has four cylinders, each of which is like the one depicted. However, it should be understood that the present system can also be used with two-cycle engines and rotary piston engines, as well as conventional reciprocating engines. Various suitable engines of these types are described in U.S. Pat. No. 3,508,530, owned by the assignee of the present application.

Figure 1:
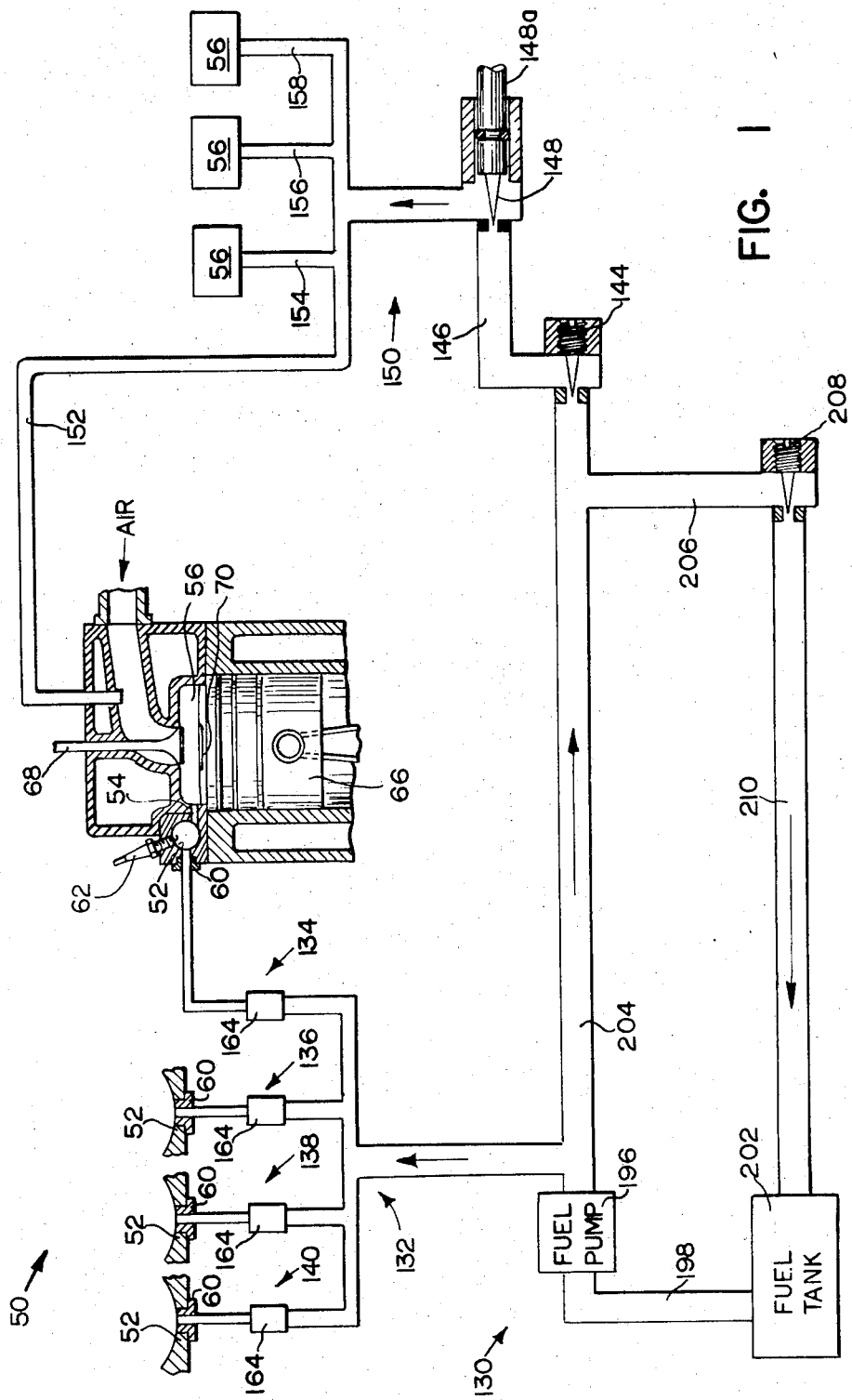
FIG. 1 is a diagrammatic view of a fuel injection system embodying the principles of my invention connected to a preignition engine cylinder shown in section.

Each cylinder includes a spherical prechamber 52 which communicates via a single passage 54 to a main chamber 56. The prechamber block is fitted with a nozzle 60 and a spark plug 62. A piston 66 reciprocates within main chamber 56 and chamber 56 is fitted with the usual intake and exhaust valves 68 and 70, respectively.

A variable pressure source indicated generally at 130 delivers fuel to a fuel distributing manifold 132. Four special fuel inductors 134, 136, 138 and 140 to be described later lead from manifold 132 to the four prechambers 52.

Source 130 also supplies fuel via an adjustable needle valve 144, a line 146, and a throttle 148 in the form of an adjustable needle valve, to a manifold 150. Manifold 150 has four relatively small diameter branches 152, 154, 156 and 158 leading to the intake ports of the four main chambers 56. Valve 144 serves as a coarse control over fuel flow to the main chambers and throttle 148 provides a fine control thereover. The operator throttles the engine by moving throttle plunger 148a.

Figure 3:
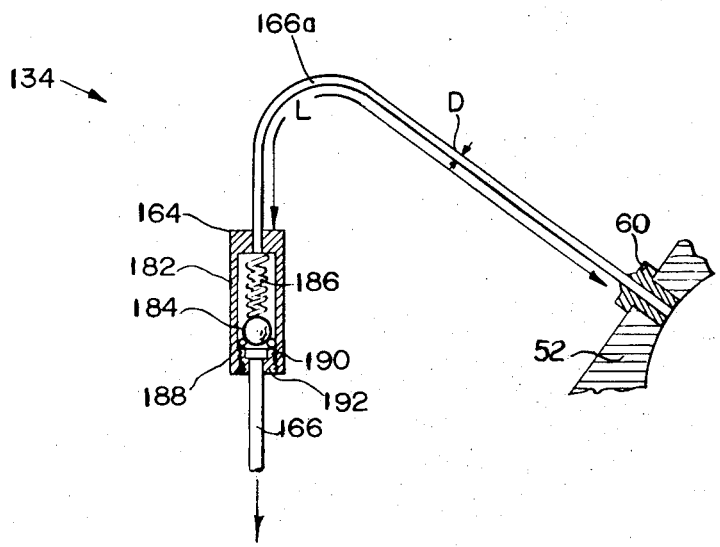
FIG. 3 is an enlarged sectional view with parts in elevation of a portion of the FIG. 1 system.

Referring now to FIGS. 1 and 3, each inductor 134, 136, 138 and 140 includes a check valve 164. One end of each valve 164 is connected by way of a small diameter fuel line 166 to manifold 132. Its other end is connected via line 166a to the nozzle 60 extending into a prechamber 52.

Each check valve 164 is set to remain closed because of the normal back pressure from the corresponding engine cylinder during the power and compression strokes of the cylinder. During this time, each valve is backed up by a solid column of substantially incompressible liquid fuel in line 166. Therefore, unlike the case with systems which inject a carbureted mixture, the valve 164 does not leak during the high pressure segment of the engine cycle.

Valves 164 open in response to the pressure drop across them during the scavenging period when the cylinder pressure, specifically the prechamber pressure, falls to a value below that of the fuel pressure. Thus, the timing and sequence of fuel injection into the engine prechambers is controlled primarily by the conventional engine intake and exhaust valves and/or the pistons without requiring any auxiliary fuel distributing valves or additional timing mechanism.

Figure 2:
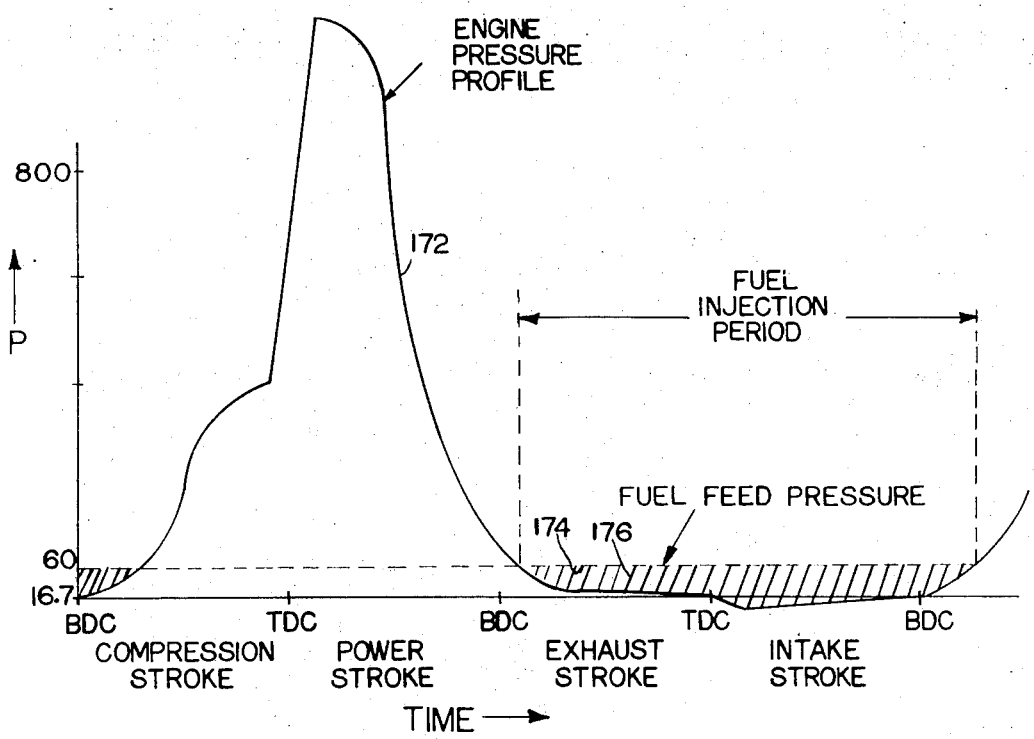
FIG. 2 is a graph illustrating the operation of the FIG. 1 system.

To illustrate, the curve 172 in FIG. 2 shows a typical pressure (P) profile in one engine 50 cylinder. Assume that the fuel pressure in manifold 132 (FIG. 1) is maintained at a constant pressure of, say, 60 psi, as illustrated by the dotted line 174 in FIG. 2. The pressure in the prechamber 52 typically exceeds the fuel feed pressure (line 174) in manifold 132 from a point shortly after the commencement of the cylinder compression stroke to a point shortly after commencement of the exhaust stroke. During the interval, therefore, valve 164 in the inductor associated with that cylinder is closed and no fuel is fed to prechamber 52.

After commencement of the exhaust stroke, however, the pressure in that cylinder drops below the 60 psi fuel feed pressure in manifold 132. Thereupon, valve 164 opens and fuel enters the corresponding prechamber 52. Fuel continues to flow into the prechamber during the exhaust and intake portions of the cycle and until shortly after the commencement of the next compression stroke. At this point, the cylinder pressure builds up until it exceeds the fuel feed pressure and closes the valve 134. The total fuel injection is indicated by the length of the hatched area 176 in FIG. 2. The amount of fuel fed to the prechambers may be controlled by regulating the pressure of the fuel supplied by source 130 to manifold 132. This has the effect of moving line 174 to FIG. 2 up or down relative to curve 172.

Refer again to FIG. 3 which shows in more detail the construction of one inductor, e.g. inductor 134. The line portion 166a between valve 164 and nozzle 60 has a very small diameter D in relation to its length L. That is, the ratio D/L should be considerably less than 1. For example, in one embodiment of the invention, the ratio D/L is on the order of .0003. This produces a pressure drop between manifold 132 and the cylinder prechamber which is great enough so that small cycle-to-cycle perturburations in the firing cycle will not grossly affect fuel flow. Moreover, the small diameter line portion minimizes the standing volume of fuel adjacent to the hot engine cylinder and, therefore, minimizes the likelihood of fuel caking and clogging in nozzle 60.

For maximum system performance, valve 164 should positively seal. This condition can be satisfied by a good conventional dilating O-ring check valve or a small check valve employing a spring-loaded ball or plunger as long as it is backed up by a column of liquid in the fuel line as mentioned above. Preferably, the spring bias should be such as to start and stop the flow of fuel into the associated cylinder at precisely the proper points in the combustion cycle to obtain the required injection period 176 (FIG. 2).

Referring again to FIG. 1, fuel source 130 comprises a fuel pump 196 which has its intake 198 connected to a fuel tank 202 and its outlet pressure line 204 connected to manifold 132 and needle valve 144. Line 204 is also connected back to tank 202 by way of a line 206, needle valve 208 and a line 210. Valve 208 controls the return flow of fuel to tank 202 and functions as an engine idling adjustment.

Pump 196 is preferably a constant volume pump geared directly to the engine so that it delivers a substantially constant volume of fuel to the prechambers and main chambers per engine cycle over all engine speeds. Further, fuel lines 146, 198, 204, 206 and 210 and manifold 132 provide large diameter fluid paths between pump 196 and inductors 134, 136, 138 and 140 and between the pump and fuel lines 152, 154, 156 and 158. Also, as noted above, the inductors themselves each have a diameter-to-length ratio which is considerably less than 1, i.e. on the order of .0003. Hence, they may be considered as substantially equivalent to a laminar flow orifice for fluid flow pressure drop considerations. With these constraints, it can be shown that the volume of fuel delivered to both chambers of each cylinder is not a function of engine speed, but rather is substantially constant per engine cycle.

The adjustment of valves 144 and 208 controls the fuel pressure at the inlets of inductors 134, 136, 138 and 140. That is, the closing of valves 144 and 208 reduces the amount of fuel returning to tank 202 and delivered to the main chambers and, hence, increases the fuel pressure at the inlet ends of the prechamber inductors. Also, the settings of valves 144 and 208, as well as throttle 148, determine the fuel-air ratio in main chambers 56.

Preferably, valve 208 is adjusted so that when throttle 148 is fully closed, sufficient fuel is delivered to each prechamber 52 to run the engine at a suitable idling speed. That is, the engine runs unthrottled; when the engine idles, no fuel at all is fed to the cylinder main chambers. Rather, the fuel injection period and pressure is such that a charge of fuel is fed into each prechamber which is sufficient to idle the engine. Enough air flows into the prechamber from the corresponding main chamber during each intake stroke to form with this prechamber charge, a combustible mixture. Also during the scavenging portion of the engine cycle, the combustion products in the prechamber are drawn out through the main chamber.

As the operator opens throttle 148, fuel is fed to the engine main chambers 56 during the intake stroke portions of the engine cycle. This fuel mixes with the air which enters when air intake valve 68 opens, forming a combustible mixture in each chamber 56. The main charge in each cylinder is then ignited when the corresponding piston 66 approximates top dead center by the hot gas jet from the corresponding prechamber as fully described above. The ignition of the main chamber charge then results in increased engine output power and speed. Accordingly, the engine can be characterized as one of the stratified charge type.

Since pump 196 is geared directly to the engine, it pumps more fuel as engine speed increases to meet the increased pressure demand. As the engine runs faster, each check valve 164 sees a higher fuel pressure from the pump, but remains open for a shorter period of time. Therefore, assuming a given setting of throttle 148, the amount of fuel injected into each prechamber remains substantially constant. As the engine load increases, however, the operator must open throttle 148 to supply fuel to the cylinders 56 to maintain the same engine speed. Some of this added fuel is carried over into the prechambers along with the air. Normally, this carryover, when added to the unthrottled fuel charge to the prechamber, would result in an excessive amount of fuel being present there, causing flooding. In the present system, however, this problem is avoided because, as best seen from FIG. 1, when the throttle 148 is opened to increase the amount of fuel fed via line 204 to the main chambers 56, the pressure drops in the branch line leading to manifold 132 serving the prechambers 52.

Thus, as the load increases, less fuel is injected into the prechambers via manifold 132 to compensate for the increased carryover fuel. As a result, the total amount of fuel mixed with the air in the prechambers remains relatively constant, assuring a combustible mixture in the prechambers and smooth engine operation over a wide range of engine load and speed regimes.

My injection system also works well with a two-cycle engine. Its operation is much the same as described above except that fuel is injected into each prechamber twice as often as it is in the four-cycle engine in FIG. 1, and the main fuel charge is dribbled directly into the main chamber of each cylinder, the intake and exhaust being controlled by the piston.

Figure 4:
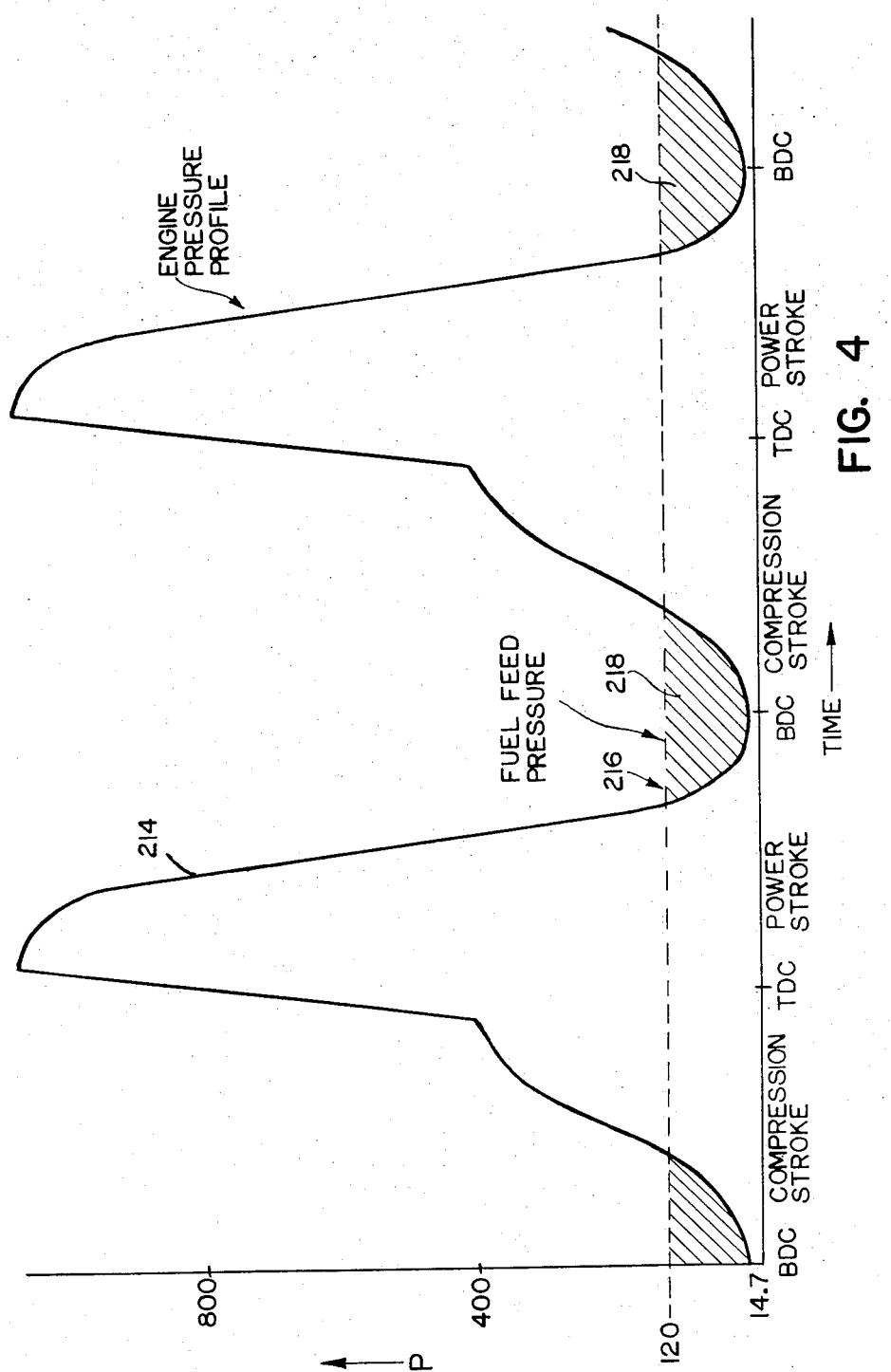
FIG. 4 is a graph similar to FIG. 2 illustrating the operation of my system with a two-cycle engine.

The curve 214 in FIG. 4 shows a typical pressure (P) profile in one cylinder of a two-cycle, three-cylinder engine. Assume that the pressure in manifold 132 (FIG. 1) is maintained at, say, 120 psi as indicated by line 216. FIG. 4 shows that the pressure in the cylinder prechamber falls below the fuel feed pressure (line 216) whenever the piston is near bottom dead center. During each of these periods indicated by the hatched areas 218, a precise charge of fuel is introduced into the prechamber. With a zero fuel-air ratio in the corresponding main chamber as described above, the charge is sufficient to operate the engine at a suitable idling speed.

It is also possible to improve further the performance of the two-cycle engine by employing inductors similar to inductor 134 (FIG. 3) to controlledly feed fuel to the engine main chambers. In this event, the inductors are included in the lines between manifold 150 (FIG. 1) and the engine main chambers and they operate much like those associated with the prechambers. During injection period 218, the valves in these inductors open to introduce charges of fuel into the main chambers in quantities determined by the throttle setting.

Figure 5:
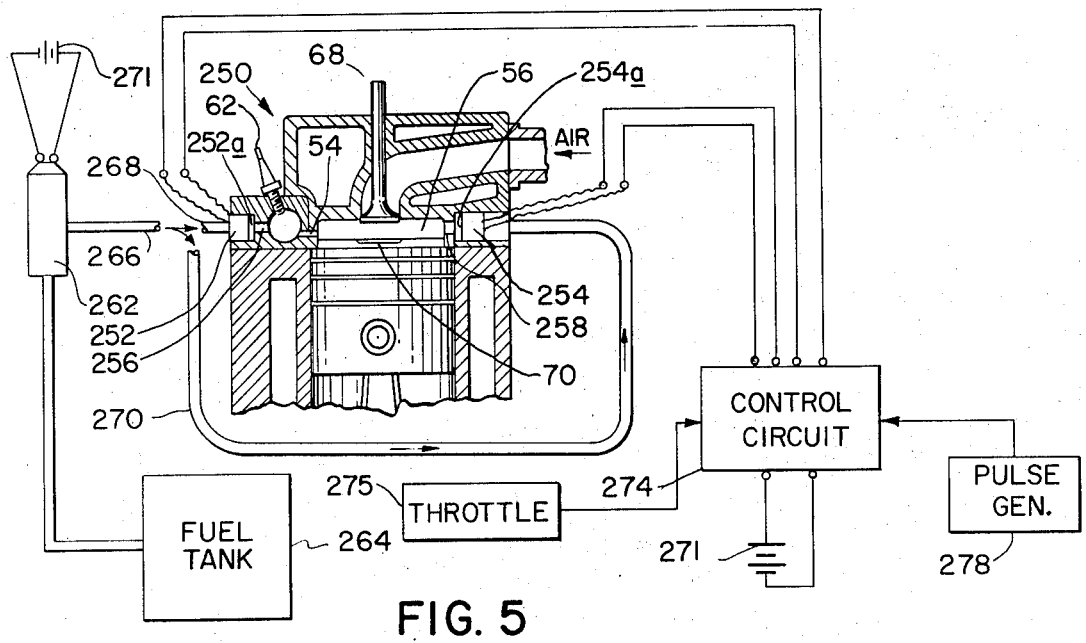
FIG. 5 is a view similar to FIG. 1 showing another embodiment of my system.
Figure 6:
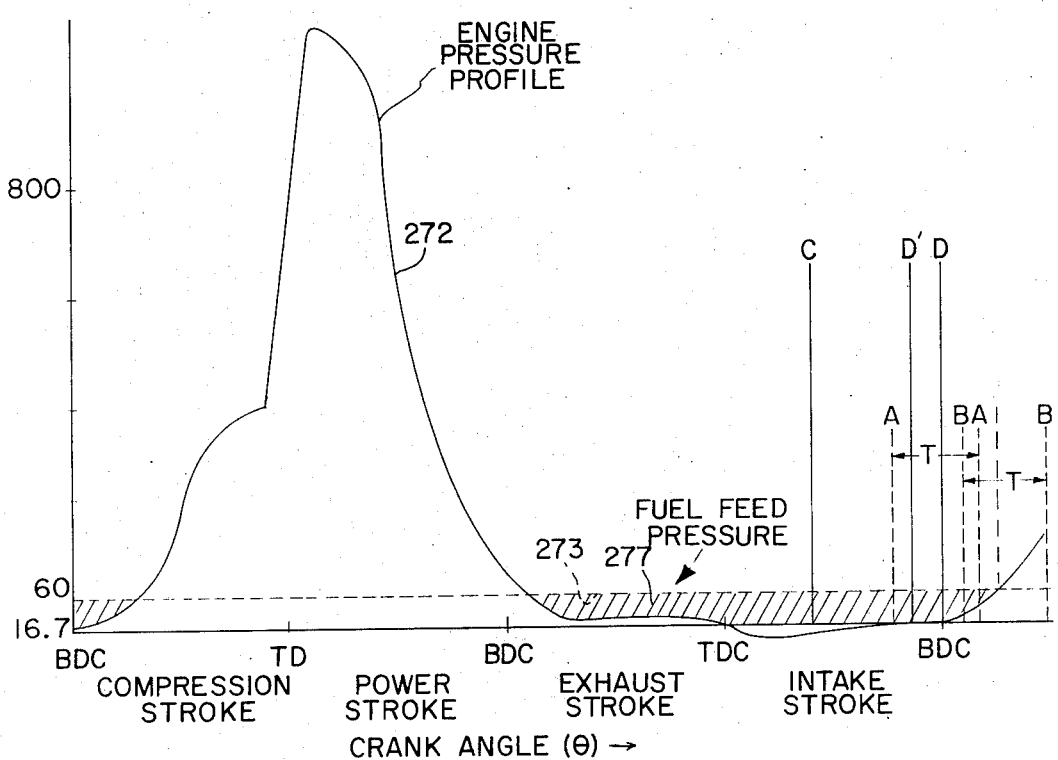
FIG. 6 is a graph similar to FIG. 2 illustrating the characteristics of the FIG. 5 system with an Otto cycle engine.

FIGS. 5-7 show another embodiment of my system. Here, fuel is injected directly into the prechamber and main chamber of each engine cylinder during the low pressure scavenging period of the engine cycle. In addition, a check valve arrangement is used to prevent backflow. However, in this version, separate backflow seating solenoid valves for the prechamber and main chamber of each cylinder are used to control the crank angle duration of fuel injection and also the point of injection during each engine cycle so that fuel is introduced into the two chambers only during certain segments of the scavenging period.

The advantage of this system embodiment is that the fuel pressure need not be varied as a function of engine speed or of fuel volatility or viscosity so that a constant pressure fuel source can be used.

FIG. 5 illustrates the modified fuel system in conjunction with one engine cylinder 250 of a multi-cylinder engine similar to the one shown in FIG. 1. The remaining engine cylinders operate exactly the same as cylinder 250 and so will not be detailed here. Also, since cylinder 250 is the same as the one shown in FIG. 1, the same numerals will be used to designate its various parts.

Separate solenoid valves 252 and 254 feed fuel directly into the prechamber 52 and main chamber 56 volumes, respectively, rather than into the intake ports. Valve 252 is recessed into the wall of prechamber 52 and a very short flow orifice 256 leads from the valve outlet to the chamber proper. The main chamber valve 254 is similarly recessed into the cylinder wall and a short orifice 258 communicates between the valve 254 outlet and the compressed volume of the main chamber 56.

A conventional electrically operated constant pressure fuel pump 262 pumps fuel from a tank 264 by way of fuel lines 266, 268 and 270 to valves 252 and 254, respectively. Fuel pump 262 is powered by any suitable means such as by automobile battery 271 and typically has an outlet pressure on the order of 35 psi.

Valves 252 and 254 are solenoid-operated and are designed such that in the closed position, the high cylinder pressure will not cause backflow so that they combine the functions of a solenoid valve and a check valve. Thus, each valve can be opened electrically so long as the pressure in the associated chamber 52 or 56 is less than the pressure at the valve inlet.

To illustrate, the curve 272 in FIG. 6 illustrates the variation in the cylinder pressure (P) with the crank angle $\theta$. Assume that the fuel pressure in fuel line 270 (FIG. 5) is maintained at a constant pressure of 60 psi as shown by the dotted line 273 in FIG. 6. The pressure in the main chamber 56 typically exceeds the fuel feed pressure from a point shortly after commencement of the compression stroke to a point shortly after commencement of the exhaust stroke. During this interval, then, the solenoid valve 254 is closed and no fuel is fed to chamber 56.

After commencement of the exhaust stroke, however, the pressure in chamber 56 drops below the 60 psi fuel feed pressure in line 270 as shown by the shaded area 277. This condition persists until shortly after the commencement of the next compression stroke. Consequently, during this portion of the engine cycle, fuel enters main chamber 56 whenever solenoid valve 254 is actuated.

Valves 252 and 254 are electrically connected by way of a control circuit 274 to a voltage source such as automobile battery 271. There is a separate circuit 274 for each cylinder 250 in the engine. Each circuit 274 is triggered by a signal from a pulse generator 278 which may be simply a separate set of points in the ignition distributor or a take-off from the high tension spark plug wires or any other available signal source which is actuated at a particular engine shaft position for all engine shaft speeds.

In practice, the circuit 274 for each pair of solenoids 252 and 254 is triggered once every two revolutions in a four-cycle engine and once every revolution in a two-cycle engine so as to hold the solenoids open for a set period of time during the lower cylinder pressure scavenging portion of the cycle. Also, the control circuit includes a "throttle" adjustment 275 by which the driver can vary the operation of the solenoid valves and thus vary the amount of fuel fed to the cylinders for different engine loads and speeds.

As alluded to previously, a main reason for using the two solenoids 252 and 254 in each cylinder is to be able to vary the amount of fuel injected into the main chamber 56 from zero to full load engine output, while keeping the total amount of fuel present in the prechamber 52 to a relatively low level to insure a combustible prechamber fuel-air mixture.

In most applications, this latter requirement can be satisfied simply by maintaining the injection time of the prechamber solenoid 252 approximately constant at all engine speeds and varying it inversely with main chamber load. Control of the prechamber fuel-air ratio in this fashion is possible even when the main chamber ratio is varied because (1) the torque output of most engines does not change significantly with speed, and (2) if the prechamber 252 is properly designed, the combustible fuel-air ratio therein is fairly broad in range. Thus, while some adjustments might be desired for optimizing the efficiency of prechamber burning, for the sake of simplicity, circuit 274 is set to actuate solenoid 252 such that it closes at the same crank angle point for all engine loads and speeds and to hold the valve open for a period of time which is approximately constant with engine speed and decreases with load. Two different techniques may be employed to vary the amount of fuel fed to main chamber 56 to vary engine output. The preferable control technique is to close the main chamber solenoid at a fixed point in the engine cycle (i.e. in a manner similar to a prechamber solenoid 252) and then adjust throttle 275 to vary the period during which the solenoid 254 remains open.

Thus, to illustrate the first technique, assume that upon the occurrence of each trigger signal from pulse generator 278, control circuit 274 applies an actuating signal to solenoid valve 254, causing it to remain open for a fixed period of time T as indicated in FIG. 6. Now when the operator varies the throttle 275 adjustment, the point at which period T commences is varied. In other words, period T is shifted to the left or right relative to crank angle $\theta$.

For high engine speeds, he adjusts the throttle so that period T is situated at A—A entirely within that portion of the engine cycle when the main chamber pressure is less than the fuel supply pressure, i.e. within shaded area 277 in FIG. 6. Thus, during the entire time the solenoid valve 254 is actuated, the associated check valve 254a allows fuel to be fed directly into the main chamber 56.

On the other hand, assume now that the driver wishes to operate at idling speed. He adjusts the throttle 275 so that the period T is shifted to the right to B—B in FIG. 6. Now, a predominant portion of this period T during which the solenoid valve 254 is actuated coincides with a relatively high pressure condition in the main chamber 56, i.e. outside shaded area 277, so that check valve 254a is held closed.

In other words, as soon as the pressure in the main chamber exceeds the 60 psi cut-off pressure for the check valve 254a, the supply of fuel to the main chamber is cut off whether or not the valve 254 is actuated. In this example, then, fuel is fed into chamber 56 only during the relatively short time indicated by the portion of the shaded area 277 between B—B in FIG. 6.

To achieve this kind of control, the control circuit 274 includes a conventional variable delay circuit so that upon the occurrence of each signal from the pulse generator 278, circuit 274 applies an actuating signal to valve 254 which is more or less delayed from the trigger signal, depending upon the setting of throttle 275.

Alternatively, the generator 278 can have associated with it a conventional distributor which applies trigger signals to the control circuit 274 for each cylinder in the proper sequence. These signals can be retarded and advanced as needed to control the point at which the various main chamber solenoid valves are actuated.

Using the other approach, control circuit 274 actuates the solenoid valve 254 at the same crank angle point in the engine cycle, but keeps it open for a period of time which varies with the throttle 275 setting. For example, assume that the circuit 274 is permanently set to actuate valve 254 at the crank angle point indicated by C in FIG. 6. Now, with a high speed throttle setting, circuit 274 applies the actuating signal to valve 254 for a relatively long time from C to D in FIG. 6, so that the solenoid opening period covers a relatively large portion of the low-pressure crank angle segment indicated by shaded area 277. On the other hand, for lighter loads, the operator sets throttle 275 so that circuit 274 applies the actuating signal to the solenoid valve 254 for a relatively short period of time, i.e. from C to D' in FIG. 6. As a result, the solenoid opening period covers a smaller portion of the low-pressure crank angle segment indicated by the shaded area 277.

To achieve this kind of control, circuit 274 includes a conventional R-C network having a variable time constant. That is, either the resistive element or the capacitive element is varied as the throttle setting is varied. The signal from pulse generator 278 is applied to this network so that the output of the network is a pulse whose duration depends on the network's time constant. This pulse is then used to trigger a gate connected between battery 271 and solenoid valve 254.

FIG. 7 shows a curve 210 representing the pressure profile of a two-cycle engine. In this engine, also, the amount of fuel fed to the main chamber can be controlled in exactly the same way as described above by advancing and retarding the crank angle period T or by varying the period during which the valve 254 is open.

Preferably, the valve opening time period or the injection period should be kept as close as possible to the end of the low-pressure scavenging portion of the engine cycle, i.e. to the right of shaded area 277 in FIG. 6, to insure that most of the injected fuel will be trapped in the combustion chamber portion of chamber 56. Otherwise, the fuel has sufficient time to mix with the swept volume air during the scavenging portion of the engine cycle. Also, it tends to become lost or trapped in the piston head squish volumes, ring glands, exhaust ports, etc. Accordingly, operation near the end of the scavenging period helps to maximize the efficiency of the engine and reduce its hydrocarbon exhaust emissions.

Turning again to FIG. 5, the special anti-backflow solenoid valve 252 and 254 can be used for the direct injection of fuel into the combustion chamber of most spark ignition engines. However, in some cases, certain problems may arise. For example, the injection of a solid droplet or core of unatomized and unevaporated fuel into the combustion chamber of a standard spark ignition engine close to the compression stroke might cause some stratification. In addition, the compressed charge may not be in a completely homogeneous fuel-/air ratio so that there may be some cycle-to-cycle variation in the ratio.

In any event, the valve is especially suitable for preignition engines, particularly the one disclosed in the aforesaid U.S. Pat. No. 3,508,530. This is because the prechamber 52 volume is extremely hot and turbulent so that the fuel injected into the prechamber is quickly mixed and vaporized during the compression stroke. Also, a homogeneous fuel/air mixture is not even required in the main chamber because of the particular nature of the burning process in the main chamber which is completely described in the aforesaid patent.

Thus, until the present time, preignition engines have not reached their full potential, primarily because of the lack of a compatible fuel injection system for them which responds quickly enough to meet the special demands of this type of engine. The present injection system meets these demands. At the same time, the nature of the combustion process in preignition engines optimizes the performance of my fuel injection system. In other words, there is a synergism between the injection system disclosed in the aforesaid U.S. Pat. No. 3,508,530 which produces a motive energy source which is especially efficient and free of exhaust pollutants. Yet, at the same time, the fuel injection system is relatively inexpensive to make and maintain so that the overall engine is similarly endowed.

While we have described a system in which the setting of the prechamber solenoid valve 252 remains fixed at all engine speeds, under certain circumstances, it may be desirable to provide a trim adjustment in circuit 274 so that the point at which the prechamber valve opens or the time period of its opening varies somewhat. This is easily accomplished by including a separate delay network or R-C network for solenoid 252 in circuit 274 so that it controls the prechamber solenoid valve 252 in the same manner as it does the main chamber valve 254. Of course, the prechamber valve may open and close at different points in the engine cycle from the main chamber valve.

The characteristics of the present injection system also enable it to handle special conditions which might arise during the operation of the preignition engine associated therewith. For example, if it is desired to decelerate very quickly as during engine braking, circuit 274 can be arranged to cut off the fuel supply to both the prechamber 52 and the main chamber 56 very quickly so that there is maximum deceleration. This is possible because of the rapid response time of the solenoid valves 252 and 254 and also because the valves inject directly into the main chamber so that essentially no fuel remains to be burned once the valves are closed. This is in sharp contrast to the conventional injection-type engines wherein fuel is injected into the air intake port as opposed to the combustion chamber itself. Not only are those valves relatively slow to respond but, also, even after they close, the combustion process continues on the residual fuel in the intake port. Consequently, engine braking is slower.

A further advantage of the present system is that it can be adjusted to handle varying fuel input pressures. More particularly, because certain fuels have greater volatility than others, it may become necessary to increase the fuel feed pressure in order to minimize the tendency of the fuel to evaporate and boil off. This is done both for cost considerations and also to minimize the amount of vapor-like pollutants emanating from the engine. These higher input pressures are accommodated simply by retarding the crank angle point at which fuel is injected or by shortening the time period of injection in the manner described above. Thus, an engine incorporating the present system can run on a wide variety of fuels without requiring extensive modification. Only a change in the setting of the control circuit 274 is required.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

I claim:

1. In an internal combustion engine of the stratified charge type having one or more cylinders, each including a main chamber and a communicating prechamber, said prechamber receiving its primary air supply only from said main chamber, a fuel supply system comprising
   A. means including an air supply passage for supplying fuel and air to each main chamber of each engine cylinder as a function of engine load so that the fuel supply to each main chamber increases and decreases, respectively, with increase and decrease in engine load,
   B. a fuel pump for continuously maintaining a fuel supply pressure substantially constant with respect to engine crank angle and above air supply passage pressure, whereby said fuel supply pressure exceeds prechamber pressure during periods of each engine cycle under all speed and load conditions,
   C. a manifold connected to said pump for receiving therefrom fuel at said fuel supply pressure,
   D. a fuel line connected between said manifold and the prechamber for each engine cylinder for conducting fuel at said fuel supply pressure directly to each prechamber, each said line including a valve responsive to the difference between prechamber pressure and pressure in said fuel line
      1. arranged to remain closed during the compression and power strokes of the corresponding cylinder, and
      2. set to open during at least part of the periods of the corresponding cylinder when the prechamber pressure is less than the fuel line pressure, and
   E. means for controlling the amount of fuel conducted to said supplying means and said manifold so that the amount of fuel conducted to said manifold varies inversely with the amount of fuel conducted to said supplying means, said controlling means comprising means for increasing the differential between manifold pressure and air supply passage pressure with decrease in fuel conducted to said supplying means.

2. A fuel injection system as defined in claim 1, said supplying means further including
   A. a second manifold connected to said pump, and
   B. a second set of fuel lines communicating between said second manifold and the cylinder main chambers.

3. A fuel injection system as defined in claim 2 wherein each fuel line in said second set also includes a said valve.

4. A fuel injection system as defined in claim 2 and wherein said pressure differential increasing means further comprises:
   A. means for controlling the flow of fuel from said pump to said second manifold so as to regulate the fuel charges fed to said main chambers during each cycle of the engine; and
   B. means for increasing the pressure in the first said manifold with decrease in fuel supply to said second manifold.

5. A fuel supply system for an internal combustion engine of the stratified charge type having one or more cylinders, each including a main chamber and a communicating prechamber, said system comprising in combination
   A. means for feeding fuel to the main chamber of each cylinder,
   B. means for feeding air to the main chamber of each cylinder,
   C. a variable speed fuel pump for continuously maintaining a fuel supply pressure substantially constant with respect to engine crank angle and above the pressure in said air feeding means to thereby establish periods during each engine cycle under all speed and load conditions in which fuel pressure exceeds cylinder pressure, said pump having
      1. an intake port for connection to a fuel reservoir, and
      2. a fuel pressure output port in fluid communication with said main chamber fuel feeding means
   D. a plurality of fuel lines in fluid communication with said output port, each of said fuel lines being adapted to receive fuel at said fuel supply pressure and connect with a different prechamber of said engine so as to conduct fuel to the associated prechamber, E. a valve in each of said fuel lines responsive to the difference between fuel pressure and prechamber pressure,
  1. each said valve being adjusted to remain closed during all its connected cylinder compression and power strokes when cylinder pressure exceeds fuel pressure, and
  2. each said valve being set to open in response to fuel pressure in its connected fuel line during at least a portion of the period of the associated cylinder when said cylinder pressure is less than said fuel line pressure, F. a connecting passage between said main chamber and its associated prechamber for admitting to said prechamber fuel and air from said main chamber, said passage being the primary air inlet to said prechamber, G. means for regulating said feeding means to vary the introduction of fuel into said main chambers so as to control the speed and power of said engine, and H. means for controlling the amount of fuel conducted by the fuel lines to the prechambers so that as the amount of fuel fed to the main chambers decreases, the amount fed to the prechambers increases, said controlling means comprising means for increasing the differential between said fuel pressure and the pressure in said air feeding means with decrease in fuel supply to said main chambers.

6. A fuel injection system as defined in claim 5 wherein the fuel feeding means for each main chamber also includes a said check valve which opens in response to a pressure drop in said main chamber.

7. The method of injecting fuel into a prechamber of a stratified charge type internal combustion engine having a main chamber and a communicating prechamber adapted to receive its primary air supply from said main chamber, comprising the steps of
  A. providing a flow of fuel for delivery directly to each engine prechamber during each engine cycle;
  B. providing for a flow of fuel and air into each engine main chamber;
  C. admitting to each prechamber a fuel and air mixture from the corresponding main chamber;
  D. pressurizing said flow of directly delivered prechamber fuel to establish a pressure level thereof substantially constant with respect to engine crank angle and above the pressure of said flow of air to said corresponding main chamber, thereby establishing periods during each engine cycle under all speed and load conditions in which the pressure of said flow of directly delivered prechamber fuel exceeds the prechamber pressure;
  E. admitting to each prechamber said pressurized flow of directly delivered prechamber fuel as a function and only as a function of the differential between the pressure thereof and the prechamber pressure and only when the prechamber pressure is a value below the pressure of said flow of directly delivered prechamber fuel; and
  F. controlling the delivery of fuel to each prechamber inversely with the amount of fuel flowed to the communicating main chamber by increasing the pressure differential between said directly delivered prechamber fuel and said corresponding main chamber air flow as fuel delivery to said main chamber decreases.

8. A fuel injection system for a stratified charge internal combustion engine having prechambers and main chambers, each main chamber being associated with a prechamber, and including means for feeding fuel to the main chambers, said system comprising in combination
  A. a source of fuel under pressure,
  B. a fuel line conducting fuel under pressure from the source to the engine prechambers,
  C. a valve in the fuel line, said valve
    1. arranged to remain closed during the compression and power strokes of the engine when cylinder pressure exceeds fuel pressure, and
    2. set to open during at least part of the periods when the cylinder pressure is less than the fuel line pressure,
  D. means for controlling the amount of fuel conducted to the prechambers so that it varies inversely with the amount of fuel fed to the main chambers, said controlling means comprising means for reducing the pressure in said fuel line with increase in fuel supply to said main chambers; and
  E. a connecting passage between each main chamber and its associated prechamber for admitting to said prechamber fuel and air from said main chamber, said passage being the primary air inlet to said prechamber.

9. In an internal combustion engine of the stratified charge type having one or more cylinders, each including a main chamber and a communicating prechamber, said prechamber receiving its primary air supply only from said main chamber, a fuel injection system comprising
  A. a fuel pump, said pump being driven so as to pump fuel,
  B. a manifold connected to said pump,
  C. a fuel line connected between said manifold and the prechamber of each engine cylinder for conducting said fuel directly to each prechamber, each said line including a valve
    1. arranged to remain closed during the compression and power strokes of the corresponding cylinder, and
    2. set to open during at least part of the periods of the corresponding cylinder when the cylinder pressure is less than the fuel pressure in said manifold,
  D. means for supplying fuel to said main chamber of each engine cylinder as a function of engine load so that the fuel supply to each main chamber increases and decreases, respectively, with increase and decrease in engine load, and
  E. means for controlling the amount of fuel conducted to each prechamber via the manifold so that the amount varies inversely with the charge of fuel to the corresponding main chamber, said controlling means comprising means for reducing the pressure in said fuel line with increase in fuel supply to said main chamber of each engine cylinder.

10. In an internal combustion engine of the stratified charge type having one or more cylinders, each cylinder including a main chamber and a communicating prechamber associated with said main chamber, a fuel supply system comprising:

A. means including an air supply passage for feeding fuel and air to each main chamber;

B. a connecting passage between each main chamber and its associated prechamber for admitting to said prechamber fuel and air from said main chamber, said connecting passage being the primary air inlet to said prechamber;

C. a source of fuel for direct admission to said prechamber;

D. a fuel line connecting each prechamber to said fuel source for conducting fuel from said fuel source into each engine prechamber;

E. pressurizing means continuously maintaining said fuel source at a pressure substantially constant with respect to engine crank angle and above air supply passage pressure for establishing a fuel driving force in said fuel line, whereby said fuel driving force exceeds prechamber pressure during periods of each engine cycle under all speed and load conditions;

F. a valve in each fuel line continually responsive to the pressure differential between prechamber pressure and fuel line pressure for automatically opening said fuel line in response to pressure therein a value above pressure in said prechamber and otherwise closing said fuel line, whereby fuel enters said prechamber during and only during at least a portion of the periods when the prechamber pressure is less than the fuel pressure in said fuel line; and G. means for increasing the fuel supply to said prechamber as fuel input to said main chamber decreases, said fuel increasing means comprising means for increasing the pressure differential between said fuel source and said air supply passage as fuel input to said main chamber decreases.

* * * * *